May 29, 1951  R. BEAGLES  2,554,806
PULSE RATE MONITOR
Filed Sept. 29, 1944
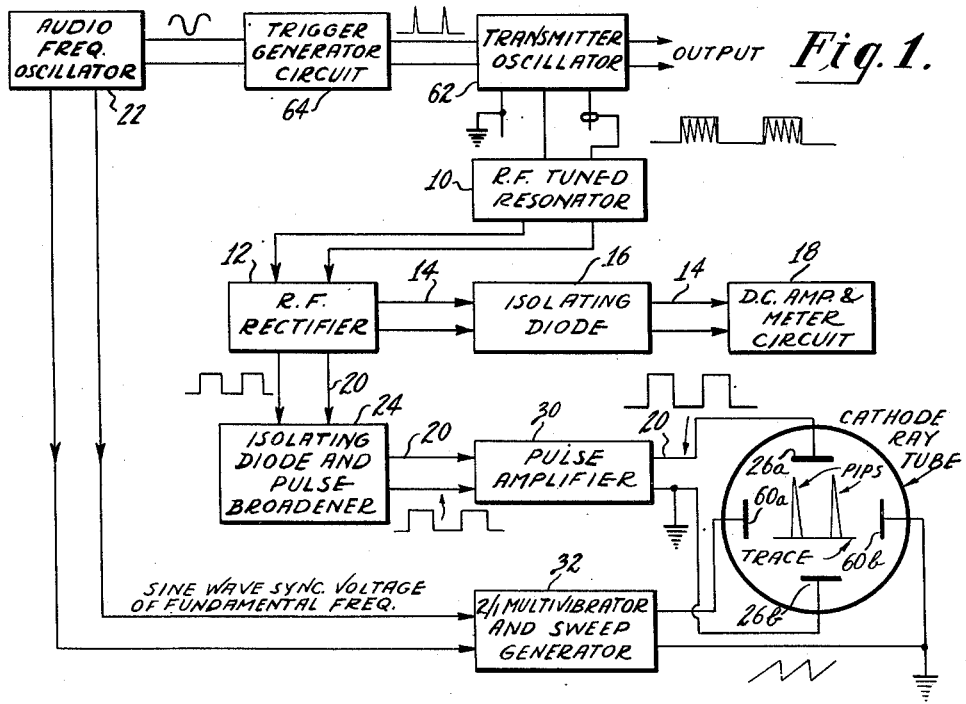
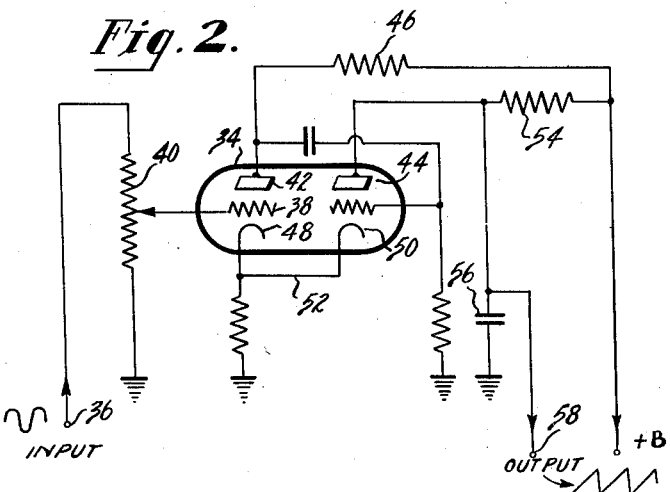
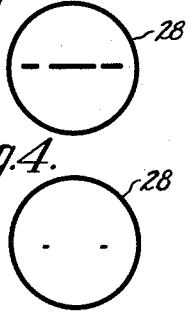
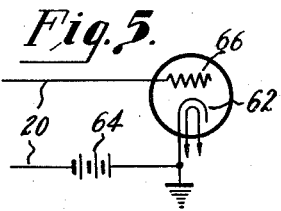
INVENTOR.
ROBERT BEAGLES
BY
ATTORNEY Patented May 29, 1951

2,554,806

UNITED STATES PATENT OFFICE 2,554,806

PULSE RATE MONITOR

Robert Beagles, Collingswood, N. J., assignor to Radio Corporation of America, a corporation of Delaware Application September 29, 1944, Serial No. 556,338

5 Claims. (Cl. 177—311)

1

This invention relates to a pulse rate monitor and has particular reference to a device for determining whether pulses recur at a desired repetition rate, or at one-half or some other fraction of said rate.

A type of pulse rate monitor in frequent use consists of an oscilloscope, to the vertical deflection plates of which the pulses to be monitored are applied, while a sweep voltage wave of a frequency equal to the desired pulse repetition rate is applied to the horizontal deflection plates. If the actual repetition rate of the monitored pulses is equal to the sweep rate, a single pulse or "pip" appears on the screen of the oscilloscope.

It sometimes happens, however, particularly with self-pulsed power oscillators of the type used in radar equipment, that a misadjustment of the oscillator occurs, as a result of which the real pulse repetition rate is one-half of the desired rate. The ordinary type of monitor, as just outlined, does not detect this misadjustment, because the indication which it gives in such cases is the same as though the repetition rate were correct, namely, a single "pip."

At very low frequencies, if the desired repetition rate is, say, 60 pulses per second, a misadjustment which produces a pulse rate of 30 pulses per second may result in a barely discernible flicker of the single pulse or "pip" which appears on the screen of the oscilloscope, but this is a very unreliable indication, and at higher frequencies the flicker cannot be seen at all.

It is, therefore, an object of the invention to provide means for indicating a change in the rate of pulsing of a pulse generator.

It is a particular object of the invention to provide an improved method of and means for determining when a self-pulsed oscillator generates pulses at half a desired rate, or at some other fraction of said rate.

Another object of the invention is to provide an improved pulse rate monitor.

An additional object of the invention is to provide simple, compact and improved equipment by means of which an easily identifiable indication of half-rate pulsing of a self-pulsed oscillator may be obtained.

These objects are achieved according to the invention by deflecting an electron beam in one plane by means of the pulses to be monitored, and deflecting the same beam in another plane by means of a sweep voltage wave whose frequency is one-half of the desired pulse repetition rate. An indication of the deflected beam is then obtained, for example, by projecting the beam

2 on the screen of an oscilloscope. If the monitored pulses recur at the desired rate, two pulses or "pips" will be seen on the screen; but if the pulse generator has not been properly adjusted and half-rate pulsing occurs, only one "pip" will appear.

In an embodiment of the invention hereinafter more fully described and applicable to self-pulsed power oscillators, the sweep voltage wave having a frequency of half the desired pulse repetition rate is derived from a sine wave audio frequency oscillator which provides a triggering voltage for the power oscillator and determines the pulse repetition rate; a 2:1 (frequency stepdown) multivibrator converts the sine wave audio frequency output of this oscillator into a saw-tooth wave sweep voltage of the desired frequency.

The following description of the invention should be read in conjunction with the accompanying drawing, in which:

Figure 1 is a block diagram of relevant portions of a self-pulsed power oscillator including the pulse rate monitor of the present invention, Figure 2 is a schematic diagram of the multivibrator and sweep generator shown in block in Figure 1, Figures 3 and 4 are views of indications appearing on the screen of the cathode ray tube of Figure 1 with different connections from those of Figure 1, and Figure 5 is a diagram showing a portion of the circuit connections to obtain the indication of Figure 4.

Referring to Fig. 1, a transmitter-oscillator 62 generates oscillations at a frequency of, say, 200 megacycles per second. A sine-wave oscillator 22 having a frequency of 200 cycles per second, for example, is connected to the transmitter-oscillator through a trigger-generator circuit indicated at 64, which converts the sine-wave output of the oscillator 22 into sharply defined pulses recurring at the same frequency, viz. 200 c. p. s., and which key or trigger the transmitter-oscillator 62. The output of the latter device consists, therefore, of pulses of radio frequency energy at a frequency equal to, and determined by the frequency of the oscillator 22.

A radio frequency tuned resonator 10 is coupled in any appropriate manner to the transmitter-oscillator 62, and receives the pulses which that device transmits. The output of the resonator is applied to a radio frequency rectifier 12 which removes the radio frequency component, leaving a rectangular pulse as indicated in Fig. 1. A portion of the rectified output is then applied through a conductive path 14 and an isolating diode 16 to a D.-C. amplifier and meter 18.

If the apparatus is not properly adjusted, the pulse repetition rate will not be equal to that of the audio frequency oscillator 22, and most frequently such misadjustment will result in half-rate pulsing.

For monitoring purposes, therefore, another portion of the rectified output with which the present invention is more intimately concerned is applied through conductive path 20 and an isolating diode and pulse broadener 24 to vertical deflecting plates 26a, 26b of a cathode ray tube 28. If necessary, a pulse amplifier 30 may be included in the conductive path 20.

The sine wave voltage output of the audio frequency oscillator 22 is fed to a multivibrator or sweep circuit 32, which may be that described in U. S. Patent No. 2,157,434 to J. L. Potter, and a preferred form of which is shown in Fig. 2.

In this form, the multivibrator 32 includes a twin triode 34, which may be an RCA Type 6N7, and has an input terminal 36 connected to the control grid 38 of one of the triodes through a variable resistor 40. As in conventional multivibrators, the anodes 42 and 44, respectively, of the two triodes are connected through an anode resistor 46, and their cathodes 48 and 50, respectively, are connected by a conductor 52. The anode circuit of the triode shown on the right-hand side of Fig. 2 also includes a resistor 54, a capacitor 56 and an output terminal 58. The resistor 54 and capacitor 56 form a time constant network which converts the normally rectangular wave output of the multivibrator into a saw-tooth wave voltage, and the circuit parameters are so chosen as to create a frequency stepdown of 2:1, so that the frequency of the output sawtooth wave is 100 cycles per second. This output wave is applied to horizontal deflecting plates 60a, 60b of the cathode ray tube 28.

If the power oscillator is properly adjusted so that the repetition rate of the pulses applied to the vertical deflecting plates 26a, 26b is equal to the frequency of the audio frequency oscillator 22, two pulses or "pips" will appear on the screen of the cathode ray tube, because the electron beam in that tube will be deflected vertically by the monitored pulses twice for each horizontal sweep. If, however, the power oscillator has not been properly adjusted and half-rate pulsing results, only one "pip" will be seen on the screen of the cathode ray tube. The maladjustment will thus be immediately detected, and appropriate steps may then be taken to secure proper adjustment.

While the invention has been described primarily with reference to the detection of half-rate pulsing, it will be apparent that it is equally applicable to a situation where the actual repetition rate is some other undesired fraction (having the form 1/n, where n is any integer 3, 4, 5 . . . n) of the desired rate. It will then be necessary for the frequency of the sweep voltage to be the same fraction of the desired repetition rate as is the suspected undesired repetition rate.

It will further be apparent that the invention includes any variation of an electron beam by the monitored pulses, further variation of the beam by a voltage whose frequency is a fraction of the desired pulse repetition rate, and indication of the resultant beam; and "variation" is to be understood here to include any variation of density or position of the beam, as well as modulation thereof.

The arrangement illustrated by Fig. 1 may, for example, be varied by applying the monitored pulses to the grid of the cathode ray tube instead of to the vertical deflecting plates. The sweep voltage will give a trace which is a horizontal line, and if the frequency of the sweep voltage is made half of the desired rate, this will be cut off twice by the pulses. If, therefore, the pulse repetition rate is correct, the indication will, in this case, be a horizontal line with two holes in it (as in Fig. 3) and any other trace will be an indication of wrong pulsing.

As an alternative to the last described arrangement, the cathode ray tube may be biased to cut-off, and the pulses employed to overcome this bias, so that the indication for correct pulsing will be two stationary dots, as illustrated by Fig. 4. Any other trace will indicate wrong pulsing. Fig. 5 is a diagram of the connections to be made to achieve this result. One branch of the conductive path 20 of Fig. 1 carrying the pulses to be monitored is connected to the grid of the cathode ray tube, indicated at 66. The other branch is connected to the cathode 62 of the tube, and hence to ground, through a source 64 of direct current which biases the tube to cut-off, except when overcome by the monitored pulses.

There has thus been described a simple and effective method of and means for monitoring pulses, in which an electron beam is deflected in one plane by means of a saw-tooth wave sweep voltage having a frequency equal to a fraction of the desired pulse repetition rate, while the same beam is deflected in another plane by the monitored pulses, and an indication of the resultantly deflected beam is obtained. In the application of the invention to the monitoring of a self-pulsed power oscillator, the sweep voltage may be derived from the oscillator from which the triggering voltage for the power oscillator is obtained.

I claim as my invention:

1. In apparatus for determining whether pulses of energy from a power oscillator recur at a desired rate, means for triggering said oscillator at said desired rate including an audio frequency oscillator, means for deriving from said audio frequency oscillator a saw-tooth wave sweep voltage having a frequency equal to 1/n that of said desired rate where n is a small integer, means for establishing an electron beam, means for deflecting said beam in one plane by said pulses, means for deflecting said beam in another plane by said sweep voltage, and means for indicating the resultantly deflected beam.

2. Apparatus, according to claim 1, where n is equal to 2.

3. In apparatus for determining whether pulses of energy from a power oscillator recur at a desired rate, means for triggering said oscillator at said desired rate including an audio frequency oscillator, means for deriving from said audio frequency oscillator a saw-tooth wave sweep voltage having a frequency 1/n that of said desired rate where n is a small integer, a cathode ray tube, means for establishing an electron beam in said tube, means for deflecting said beam in a plane by said sweep voltage, and means for applying said pulses to the grid of said tube.

4. Apparatus, according to claim 3, in which said cathode ray tube is biased to cut-off and means for applying said pulses to said tube so as to overcome said bias.

5. In apparatus for determining whether pulses of energy from a power oscillator recur as a desired rate, means for triggering said oscillator at said desired rate, means synchronized with said first means for generating sweep voltage waves having a frequency equal to $1/n$ that of said desired rate where $n$ is a small integer, means for establishing an electron beam, means for deflecting said beam in one plane with said sweep voltage waves, and means for periodically interrupting the regularity of said sweep voltage waves with the pulses from said power oscillator.

ROBERT BEAGLES.

REFERENCES CITED

The following references are of record in the file of this patent:

UNITED STATES PATENTS

| Number | Name | Date |
|---|---|---|
| 2,178,074 | Jakel et al. | Oct. 31, 1939 |
| 2,274,366 | Hansen | Feb. 24, 1942 |
| 2,286,894 | Browne et al. | June 16, 1942 |
| 2,292,045 | Burnett | Aug. 4, 1942 |
| 2,347,008 | Vance | Apr. 18, 1944 |
| 2,411,648 | Brauer et al. | Nov. 26, 1946 |